United States Patent [19]
Nor

[11] Patent Number: 6,062,008
[45] Date of Patent: May 16, 2000

[54] MAGNETIC EQUINE SOCK

[75] Inventor: Joanne H. Nor, Rancho Santa Fe, Calif.

[73] Assignee: Norfields Corporation, Los Angeles, Calif.

[21] Appl. No.: 09/133,506

[22] Filed: Aug. 12, 1998

[51] Int. Cl.⁷ ................................................. A01L 15/00
[52] U.S. Cl. ................................................................ 54/82
[58] Field of Search ................................. 154/82; 168/18

[56] References Cited

U.S. PATENT DOCUMENTS

| | | | |
|---|---|---|---|
| 617,153 | 1/1899 | Galpin | 54/82 X |
| 4,456,001 | 6/1984 | Pescatore | 128/1.5 |
| 4,489,711 | 12/1984 | Latzke . | |
| 5,224,549 | 7/1993 | Lightner | 168/18 |
| 5,389,061 | 2/1995 | Nor | 54/82 X |
| 5,426,925 | 6/1995 | Smargiassi | 54/79.1 |
| 5,509,484 | 4/1996 | Landi et al. | 168/14 |

OTHER PUBLICATIONS

Photographs of Bioflex Equine Magnetic Therapy Boot

*Primary Examiner*—Robert P. Swiatek
*Attorney, Agent, or Firm*—Blakely Sokoloff Taylor & Zafman LLP

[57] ABSTRACT

An apparatus for applying magnetic therapy to a horse's foot. A bottom panel is shaped consistent with the shape of an equine foot. A side wall is coupled along one edge to the bottom panel. A heel flap extends from the bottom panel and may rotate relative thereto such that the heel flap covers the heels of the foot when worn. At least one of, and preferably all of, the heel flap, the bottom panel, and the side wall contain magnetic material, which creates a magnetic field that acts on the foot when the apparatus is worn.

11 Claims, 2 Drawing Sheets

MAGNETIC EQUINE SOCK

BACKGROUND OF THE INVENTION (1) Field of the Invention

The present invention relates to magnetic field therapy. More particularly, the invention relates to an apparatus for applying magnetic fields to an equine foot.

(2) Background

Magnetic field therapy has been applied to various areas of equine anatomy to treat subacute or chronic conditions, including horses' backs, knees, hocks, and fetlocks. Various wraps, blankets, pads, and so forth have been developed for this purpose. Often times, lameness in a horse originates in its feet. Numerous conditions, including bruises of the sole, laminitis, navicular, and others occur in the feet. These problems are often chronic and degenerative, or in any event, take a very long time to heal. Some of these problems are exacerbated or at least healing is slowed by the relatively poor circulation in the feet.

By way of example, navicular is regarded as a chronic and progressive condition precipitated by degeneration and resultant roughing of the navicular bone within the horse's foot. As the bone roughens, the deep digital flexor tendon that runs across the navicular bone becomes inflamed by its contact with the roughened surface. It has been found that increasing blood flow decreases the rate of degeneration and also speeds healing of the inflamed tendons.

Efforts have been made to stimulate circulation in the feet by applying magnets, however, it has typically involved placing one or more magnets around the feet and then bandaging the foot to retain those magnets in place. This is a time-consuming process and is made more difficult when the injured horse is resistant to such activity. Additionally, because a horse is usually supporting its weight on the foot, such bandages are prone to wearing through and/or falling off.

In view of the foregoing, it would be desirable to have an improved apparatus for applying magnetic therapy to an equine foot.

BRIEF SUMMARY OF THE INVENTION

An apparatus for applying magnetic therapy to a horse's foot is disclosed. A bottom panel is shaped consistent with the shape of an equine foot. A side wall is coupled along one edge to the bottom panel. A heel flap extends from the bottom panel and may rotate relative thereto such that the heel flap covers the heels of the foot when worn. At least one of, and preferably all of, the heel flap, the bottom panel, and the side wall contain magnetic material, which creates a magnetic field that acts on the foot when the apparatus is worn.

DETAILED DESCRIPTION OF THE INVENTION

Figure 1:
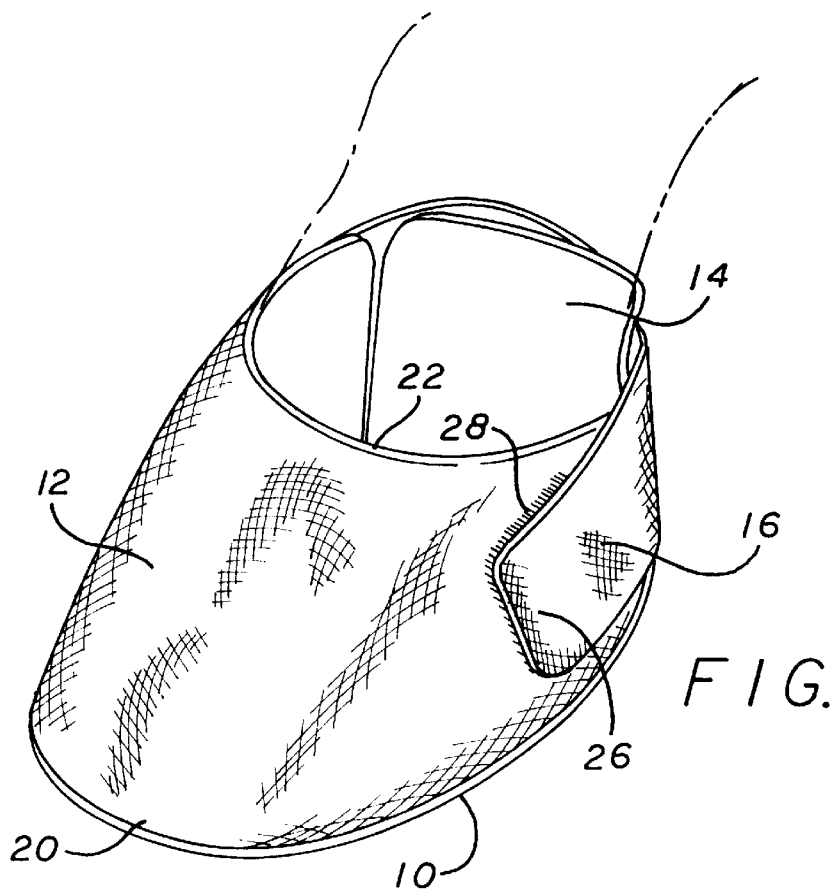
FIG. 1 is a perspective view of the magnetic sock of one embodiment of the invention.

FIG. 1 is a perspective view of the magnetic sock of one embodiment of the invention. A horse's leg is shown in phantom lines. A bottom panel 10 is coupled along a lower edge 20 of side wall 12. This coupling may be by sewing, adhesive, heat welding or any other conventional manner. Bottom panel 10 is shaped to substantially conform to the shape of a bottom of a horse hoof. Heel flap 14 extends from bottom panel 10 and is flexible such that it can be folded up over the heels of a horse's foot when the sock is on the foot. Heel flap 14 may be integrally formed with the bottom panel or coupled thereto in any conventional manner. In a preferred embodiment, each of the side wall, bottom panel, and heel flaps each comprise a magnetic material layer laminated between a first and second fibrous layer or magnetic materials embedded into the side wall, bottom panel and heel flap. The magnetic material creates a magnetic field that acts on an equine foot when the foot is within the sock. It is within the scope and contemplation of the invention that the magnetic material may be present in less than all of the side wall, bottom panel, and heel flap. An attachment strap 16 can then be overlaid across the heel flap 14 and detachably coupled to side wall 12. The attachment strap 16 may be an elastic webbing or other durable natural or synthetic material. In one embodiment, side wall 12 has a loop-like outer surface which engages the segment of hook material 28 disposed adjacent to end 26 of strap 16. A suitable hook material is a synthetic material which adheres when pressed together often sold under the trademark VELCRO™.

Figure 2:
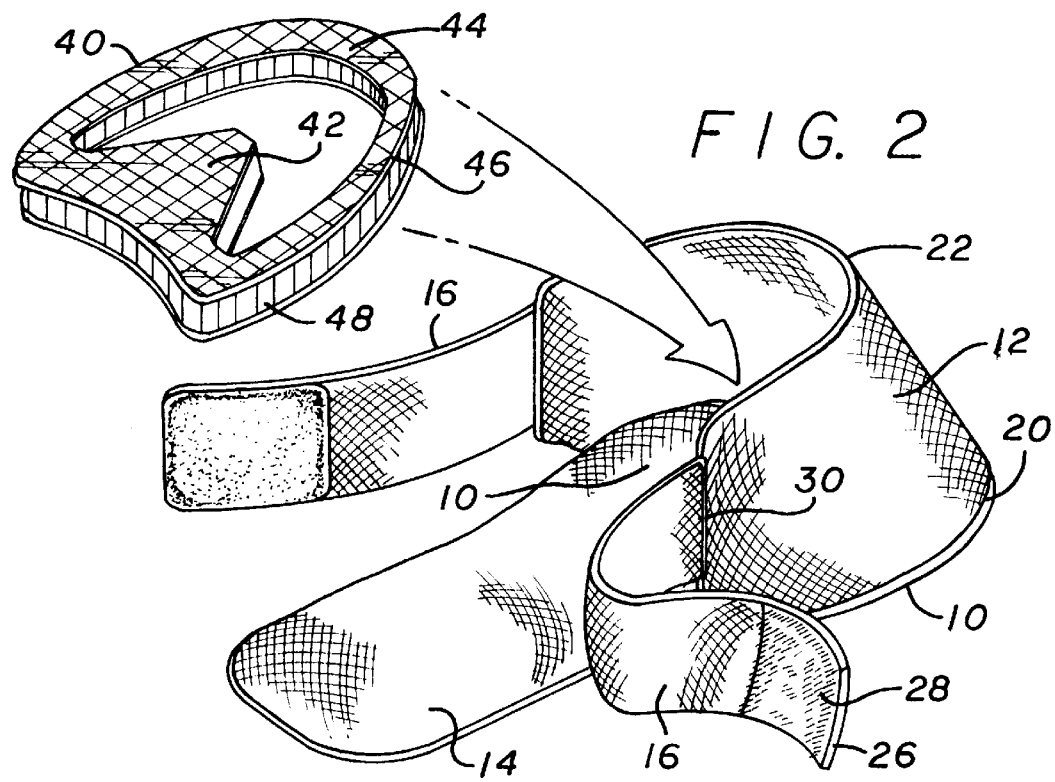
FIG. 2 shows an exploded perspective view of the sock of one embodiment of the invention.

FIG. 2 shows an exploded perspective view of the sock of one embodiment of the invention. In this figure, the optional insole 40 which has a frog portion 42 and a sole portion 44, is shown. The insert is designed to fit within a shoe of a shod horse so that pressure remains on the frog of the foot, as well as providing the proximate magnetic field at the frog and around the sole. In one embodiment, the insert is comprised of two layers, a magnetic layer 46, and a resilient honeycomb layer 48. The layers may be adhered together using any suitable adhesive. Suitable honeycomb material is commercially available from Supracor Systems, Inc. of San Jose, Calif. under the trademark SUPRACOR™ and is generally described in U.S. Pat. No. 5,509,484. The magnetic material layer 46 may be similar to that used from the heel flap but with only a single fibrous layer. The insert overlays bottom panel 10. In this view, heel flap 14 is extending from bottom panel 10 and being integrally formed therewith. Attachment straps 16 are fixedly coupled at a first end 30 to the side wall 12. The opposing end 26 which meets attachment strap 16 has hook material 28 disposed thereon. Use of hook material fasteners with a side wall having a loop-like outer surface provides maximal adjustment of the sock. However, other fastening mechanisms, including buckles, snaps, tabs, and so forth are within the scope and contemplation of the invention.

Figure 3:
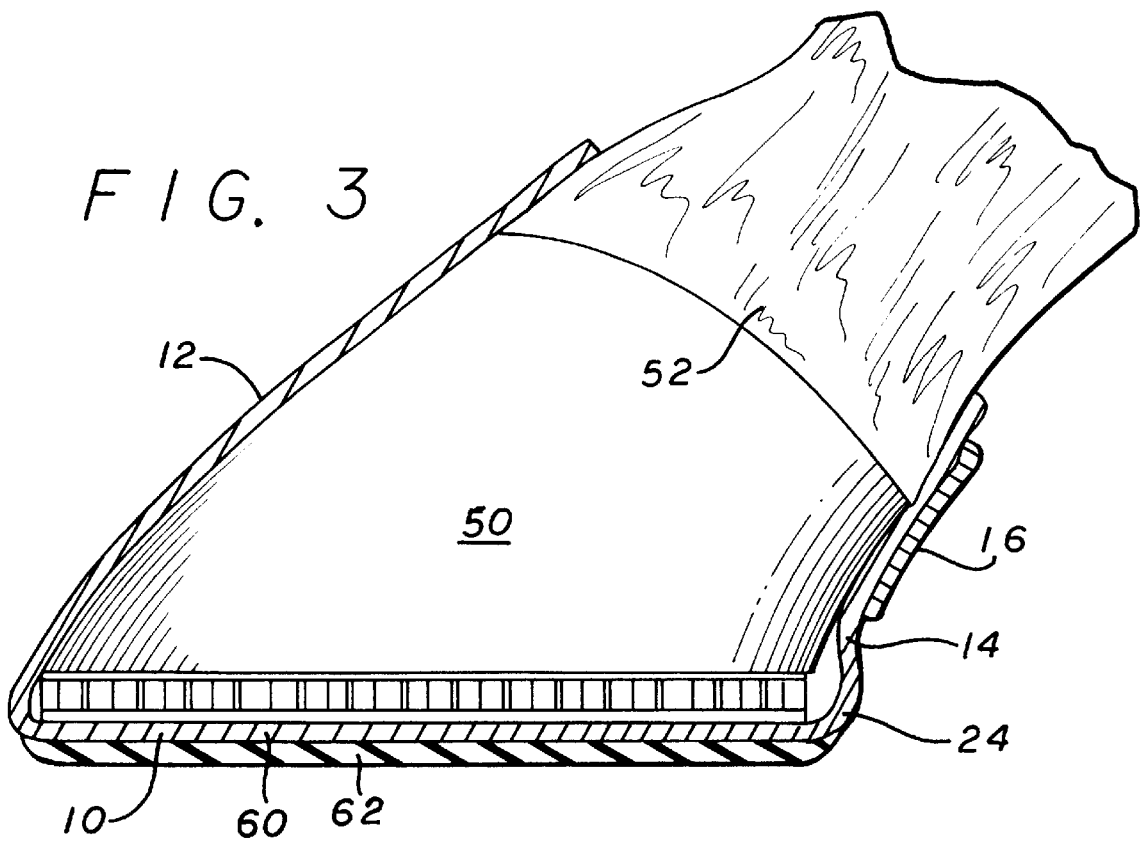
FIG. 3 is a plan sectional view of the magnetic sock of one embodiment of the invention.

FIG. 3 is a plan sectional view of the magnetic sock of one embodiment of the invention. In this embodiment, bottom panel 10 includes an inner layer 60 and an outer layer 62. Outer layer 62 may be, for example, a durable rubberized material so that the ground-bearing surface of the sock does not rapidly wear out and also is readily cleaned, in the event it becomes soiled. The inner layer 60 may be, for example, a composite of two fibrous layers sandwiching a magnetic layer therebetween. Alternatively, plastic, e.g. vinyl or the like, may be used instead of the fibrous layer(s). One suitable magnetic layer is described in U.S. Pat. No. 4,489,711 issued to Latzke; however, other magnetic materials having magnets with different magnetic patterns can also be utilized. Also, magnetic materials can be embedded into a fibrous substrate to form the layer 60.

Heel flap 14 is rotatable relative to the bottom panel 10 about hinge point 24. The straps 16 overlie the heel flap 14 and retain it in position over the heels. The magnetized heel flap is quite important in ensuring maximal blood flow to the foot. Nearly seventy-five percent of the blood supply to the sensitive structures within the foot enters through the heels. The magnetized heel flap ensures that a suitable magnetic field acts on this important area of vascular traffic.

Side wall 12 is sufficiently long that it covers hoof 50 and extends beyond coronary band 52. This has been shown to stimulate blood supply to the coronary band. The hoof wall grows down from the coronary band, and increased blood supply to this area speeds hoof growth. Increased hoof growth is particularly desirable in horses having shaley walls or horses whose use necessitates frequent reshoeing, such as thoroughbred race horses. Additionally, various hoof anomalies, such as sand cracks, quarter cracks, and abscesses may be more quickly eliminated with rapid hoof growth.

Figure 4:
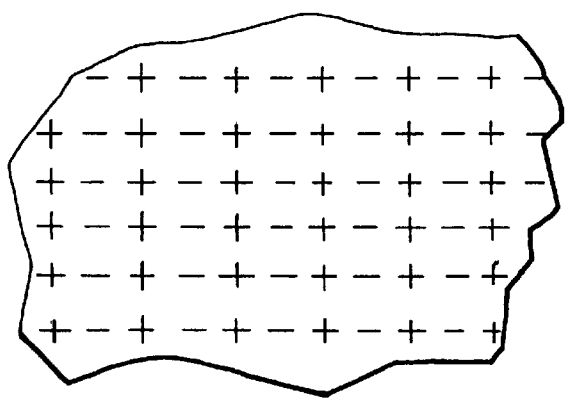
FIG. 4 shows a partial plan view of the magnetic distribution in the magnetized portion of the sock of one embodiment of the invention.
Figure 5:
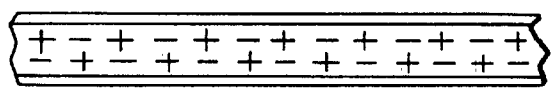
FIG. 5 shows a cross-sectional view showing the magnetic distribution in the magnetized portion of one embodiment of the invention.

FIG. 4 shows a partial plan view of the magnetic distribution in the magnetized portion of the sock of one embodiment of the invention. FIG. 5 shows a cross-sectional view showing the magnetic distribution in the magnetized portion of one embodiment of the invention. As can be seen from these figures, adjacent magnets have reverse polarities such that what is known as a bipolar magnetic field is created. It is also within the scope and contemplation of the invention the magnetic material arranged such that all poles "face" the same way, creating what is known as a unipolar magnetic field within the sock. Other distributions and patterns of magnetic material other than those shown in FIGS. 4 and 5 are within the scope and contemplation of the invention. The magnetic field strength should be in the range of about 50 to 2000 gauss. Excellent results have been obtained in the products having a field strength of approximately 350 gauss.

Conveniently, the unitary construction of the disclosed sock is very easy to install. One need merely pick up the horses foot, insert it into the sock so that the bottom of the foot rests on the inside of the bottom panel. Then fold the heel flap over the heels of the foot and pull the attachment straps in a criss-cross pattern across the heel flap to secure it. The hook material on the ends of the attachment straps readily engages the loop-like material that forms the outer surface of the side wall. There is no concern about detachment of the sock or individual magnets becoming displaced. The magnetic therapy works naturally and automatically. If the optional insole is to be used prior to inserting the foot into the sock, the insole should be place with its magnetic layer in contact with the frog and sole of the foot inside the shoe. The combined foot, shoe, and insole are then inserted into the sock as described above.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus for increasing circulation in an equine foot, the apparatus comprising:
    a bottom panel having a shape approximating a bottom of an equine foot;
    a side wall coupled to the bottom along one edge of the side wall, the side wall having a non-vertical slope; and
    a heel flap extending from the bottom panel and rotatable relative to the bottom panel,
    wherein each of the bottom panel, the side wall, and the heel flap contain magnetic material that creates a magnetic field.

2. The apparatus of claim 1 wherein the magnetic material comprises:
    a plurality of permanent magnets arranged such that pairs of adjacent magnets have a bipolar arrangement.

3. The apparatus of claim 1 wherein the magnetic material comprises:
    a plurality of permanent magnets arranged such that pairs of adjacent magnets have a unipolar arrangement.

4. The apparatus of claim 1 further comprising:
    a magnetic insole having a sole engaging region and a frog engaging region.

5. The apparatus of claim 4 wherein the insole comprises:
    a magnetic layer and a resilient honeycomb layer.

6. The apparatus of claim 1 wherein the magnetic field has a strength of greater than approximately 350 gauss.

7. The apparatus of claim 1 further comprising:
    a pair of attachment straps each having a first end coupled to the side wall such that each may extend over the heel flap and detachably couple a second end to the side wall.

8. The apparatus of claim 1 wherein the magnetic material is a magnetic plastic.

9. The apparatus of claim 1 wherein the magnetic field created is a bipolar magnetic field.

10. An apparatus for increasing circulation in an equine foot, the apparatus comprising:
    a bottom panel having a shape approximating a bottom of an equine foot;
    a side wall coupled to the bottom along one edge of the side wall, the side wall having a non-vertical slope;
    a magnetic insole having a sole engaging region and a frog engaging region;
    a magnetic layer and a resilient honeycomb layer; and
    a heel flap extending from the bottom panel and rotatable relative to the bottom panel,
    wherein at least one of the bottom panel, the side wall, and the heel flap contain a magnetic material that creates a magnetic field.

11. An apparatus for increasing circulation in an equine foot, the apparatus comprising:
    a bottom panel having a shape approximating a bottom of an equine foot;
    a side wall coupled to the bottom along one edge of the side wall, the side wall having a non-vertical slope; and
    a heel flap extending from the bottom panel and rotatable relative to the bottom panel,
    wherein at least two of the bottom panel, the side wall, and the heel flap contain magnetic material that creates a magnetic field.

* * * * *